United States Patent
Matsumura et al.

(12)

(10) Patent No.: US 11,561,194 B2
(45) Date of Patent: Jan. 24, 2023

(54) GAS SENSOR ELEMENT AND GAS SENSOR

(71) Applicant: NGK SPARK PLUG CO., LTD., Nagoya (JP)

(72) Inventors: Midori Matsumura, Nagoya (JP); Hiroshi Isomura, Nagoya (JP); Kazuki Yoshioka, Nagoya (JP); Ryosuke Ota, Nagoya (JP)

(73) Assignee: NGK SPARK PLUG CO., LTD., Aichi (JP)

( * ) Notice: Subject to any disclaimer, the term of this patent is extended or adjusted under 35 U.S.C. 154(b) by 169 days.

(21) Appl. No.: 16/761,681

(22) PCT Filed: Mar. 6, 2019

(86) PCT No.: PCT/JP2019/008926
§ 371 (c)(1),
(2) Date: May 5, 2020

(87) PCT Pub. No.: WO2019/172330
PCT Pub. Date: Sep. 12, 2019

(65) Prior Publication Data
US 2021/0181141 A1    Jun. 17, 2021

(30) Foreign Application Priority Data
Mar. 8, 2018   (JP) .............................. JP2018-041776

(51) Int. Cl.
*G01N 27/407*   (2006.01)
(52) U.S. Cl.
CPC ..... *G01N 27/4075* (2013.01); *G01N 27/4073* (2013.01)
(58) Field of Classification Search
CPC ........... G01N 27/4075; G01N 27/4073; G01N 27/409
See application file for complete search history.

(56) References Cited

U.S. PATENT DOCUMENTS

| 2008/0156644 A1* | 7/2008 | Suzuki | ............... G01N 27/4075 204/294 |
| 2019/0004008 A1* | 1/2019 | Todo | .................... G01N 27/416 |
| 2019/0041350 A1 | 2/2019 | Okamoto et al. | |

FOREIGN PATENT DOCUMENTS

| JP | 2003-322631 A | 11/2003 |
| JP | 2014-038061 A | 2/2014 |

(Continued)

OTHER PUBLICATIONS

Takanori JP2016156759A machine translation (Year: 2016).*

(Continued)

*Primary Examiner* — Luan V Van
*Assistant Examiner* — Caitlyn Mingyun Sun
(74) *Attorney, Agent, or Firm* — Sughrue Mion, PLLC (57) ABSTRACT

Disclosed is a gas sensor element having: a solid electrolyte body containing oxygen-ion conductive $ZrO_2$; a detection electrode disposed on the solid electrolyte body to be exposed to a gas under measurement; and a reference electrode disposed on the solid electrolyte body to be exposed to a reference gas. In the gas sensor element, the detection electrode contains Pt and $ZrO_2$; the detection electrode has a thickness of 3 to 10 μm; the amount of $ZrO_2$ contained relative to Pt in the detection electrode is 12 to 18 wt %; the detection electrode has a porosity of 5% or lower; and, in a particle size distribution graph of $ZrO_2$ particles in the detection electrode, a cumulative value of peaks appearing in a range of 0.025 μm to 0.200 μm is 60 to 75%, and a cumulative value of peaks appearing in a range of 1.000 μm to 3.162 μm is 2 to 7%.

4 Claims, 8 Drawing Sheets

(56) References Cited

FOREIGN PATENT DOCUMENTS

| | | |
|---|---|---|
| JP | 2016-156759 A | 9/2016 |
| WO | 2017/146120 A1 | 8/2017 |

OTHER PUBLICATIONS

Ikeda JP2017049051A machine translation (Year: 2017).*
Goto JP2015087376A (Year: 2015).*
International Search Report for PCT/JP2019/008926, dated May 14, 2019.

* cited by examiner

FIG. 9 ately cylindrical solid electrolyte body and a pair of electrodes and to a gas

GAS SENSOR ELEMENT AND GAS SENSOR

CROSS REFERENCE TO RELATED APPLICATIONS

This application is a National Stage of International Application No. PCT/JP2019/008926 filed Mar. 6, 2019, claiming priority based on Japanese Patent Application No. 2018-041776 filed Mar. 8, 2018. The content of Japanese Patent Application No. 2018-041776 is incorporated herein by reference in its entirety.

TECHNICAL FIELD

The present disclosure relates to a gas sensor element with a solid electrolyte body and a pair of electrodes and to a gas sensor having such a gas sensor element.

BACKGROUND ART

There is known a gas sensor having a gas sensor element whose electrical characteristics change according to the concentration of a specific gas component in a gas under measurement as disclosed in Patent Document 1.

For example, Patent Document 1 discloses a gas sensor element including: a bottomed cylindrical-shaped solid electrolyte body with a closed front end; a reference electrode formed on an inner surface of the solid electrolyte body; and a detection electrode formed on a front end portion of an outer surface of the solid electrolyte body. This gas sensor element is used to detect the concentration of a specific gas component in e.g. an exhaust gas discharged from an internal combustion engine.

PRIOR ART DOCUMENTS

Patent Document

Patent Document 1: Japanese Laid-Open Patent Publication No. 2016-156759

SUMMARY OF THE INVENTION

Problems to be Solved by the Invention

In the gas sensor element of Patent Document 1, the detection electrode is formed by electroless plating using platinum (Pt) or a platinum alloy as a raw material. However, the gas sensor element of Patent Document 1 faces the problem of separation of the detection electrode from the solid electrolyte body.

The present disclosure is directed to a gas sensor element capable of preventing separation of a detection electrode.

Means for Solving the Problems

According to one aspect of the present disclosure, there is provided a gas sensor element comprising: a solid electrolyte body containing oxygen ion-conductive $ZrO_2$; a detection electrode disposed on the solid electrolyte body to be exposed to a gas under measurement; and a reference electrode disposed on the solid electrolyte body to be exposed to a reference gas.

In the gas sensor element according one aspect of the present disclosure, the detection electrode contains Pt and $ZrO_2$; the detection electrode has a thickness of 3 to 10 μm; the amount of $ZrO_2$ contained relative to Pt in the detection electrode is 12 to 18 wt %; the detection electrode has a porosity of 5% or lower; and, in a graph of a particle size distribution of $ZrO_2$ particles in the detection electrode, a cumulative value of peaks appearing in a range of 0.025 μm to 0.200 μm is 60 to 75%, and a cumulative value of peaks appearing in a range of 1.000 μm to 3.162 μm is 2 to 7%.

When the amount of $ZrO_2$ contained relative to Pt in the detection electrode is decreased, there occurs separation of the detection electrode from the solid electrolyte body. On the other hand, there occurs poor electrical conduction when the amount of $ZrO_2$ contained relative to Pt in the detection electrode is increased. It is conceivable to decrease the thickness of the detection electrode for the purpose of reducing the amount of Pt used. In such a case, however, when the porosity of the detection electrode is high, there occurs poor electrical conduction due to the presence of pores between Pt particles in the detection electrode. Further, when the average particle size of the ceramic particles in the detection electrode is large, the three-phase boundary as the reaction field between Pt and the gas is relatively decreased so that there occurs deterioration in the characteristics of the detection electrode. When the average particle size of the ceramic particles in the detection electrode is small, on the other hand, the bonding force between the solid electrolyte body and the detection electrode is weakened so that there occurs separation of the detection electrode. It has accordingly been ascertained that, in order to prevent separation of the detection electrode, it is effective to not only properly set the thickness of the detection electrode, the amount of $ZrO_2$ contained relative to Pt in the detection electrode and the porosity of the detection electrode, but also set the particle size distribution of the ceramic particles in the detection electrode to within a predetermined range.

The above-configured gas sensor element according to the present disclosure effectively prevents separation of the detection electrode.

In one embodiment of the present disclosure, the gas sensor element may be configured that: the solid electrolyte body has a bottomed cylindrical shape formed with a closed front end portion and extending in the direction of an axis of the gas sensor; the detection electrode is disposed on an outer surface of the solid electrolyte body; the reference electrode is disposed on an inner surface of the solid electrolyte body; and the detection electrode is formed on the outer surface of the solid electrolyte body so as to cover a part of the front end portion.

As mentioned above, the detection electrode is formed to cover the part of the front end portion of the solid electrolyte body in one embodiment of the present disclosure. Thus, the amount of Pt required for the formation of the detection electrode is reduced as compared to the case where the detection electrode is formed to cover the whole of the front end portion of the solid electrolyte body.

According to another aspect of the present disclosure, there is provided a gas sensor comprising: the gas sensor element according to the above one embodiment of the present disclosure; a heater arranged in the bottomed cylindrical-shaped solid electrolyte body and configured to generate heat by energization thereof; and a holding member holding the gas sensor element.

In the gas sensor according to another aspect of the present disclosure, a longitudinal direction of the heater is inclined with respect to the direction of the axis such that a distance between the heater and the detection electrode decreases from a rear end side toward a front end side of the solid electrolyte body; a front end portion of the heater is in contact with the reference electrode disposed on the inner surface of the solid electrolyte body; and the contact of the front end portion of the heater with the reference electrode is opposed to the detection electrode with the reference electrode and the solid electrolyte body sandwiched therebetween.

The above-configured gas sensor according to the present disclosure allows efficient supply of heat from the heater to the detection electrode because the detection electrode formed on the part of the front end portion of the solid electrolyte body and the front end portion of the heater are opposed to each other with the reference electrode and the solid electrolyte body sandwiched therebetween as mentioned above.

According to still another aspect of the present disclosure, there is provided a gas sensor comprising: the gas sensor element according to the above one aspect of the present disclosure; and a holding member holding the gas sensor element.

The above-configured gas sensor according to the present disclosure includes the gas sensor element according to the one aspect of the present disclosure and thus obtains the same effects as those of the gas sensor element according to the one aspect of the present disclosure.

DESCRIPTION OF REFERENCE NUMERALS

2: Gas sensor element
22: Element body
24: Outer electrode
25: Inner electrode
100: Plate-shaped gas sensor element
104: Reference electrode
105: Solid electrolyte body
106: Measurement electrode

DESCRIPTION OF EMBODIMENTS

First Embodiment

Hereinafter, a first embodiment of the present disclosure will be described below with reference to the drawings.

1. Ceramic Sintered Body

Figure 1:
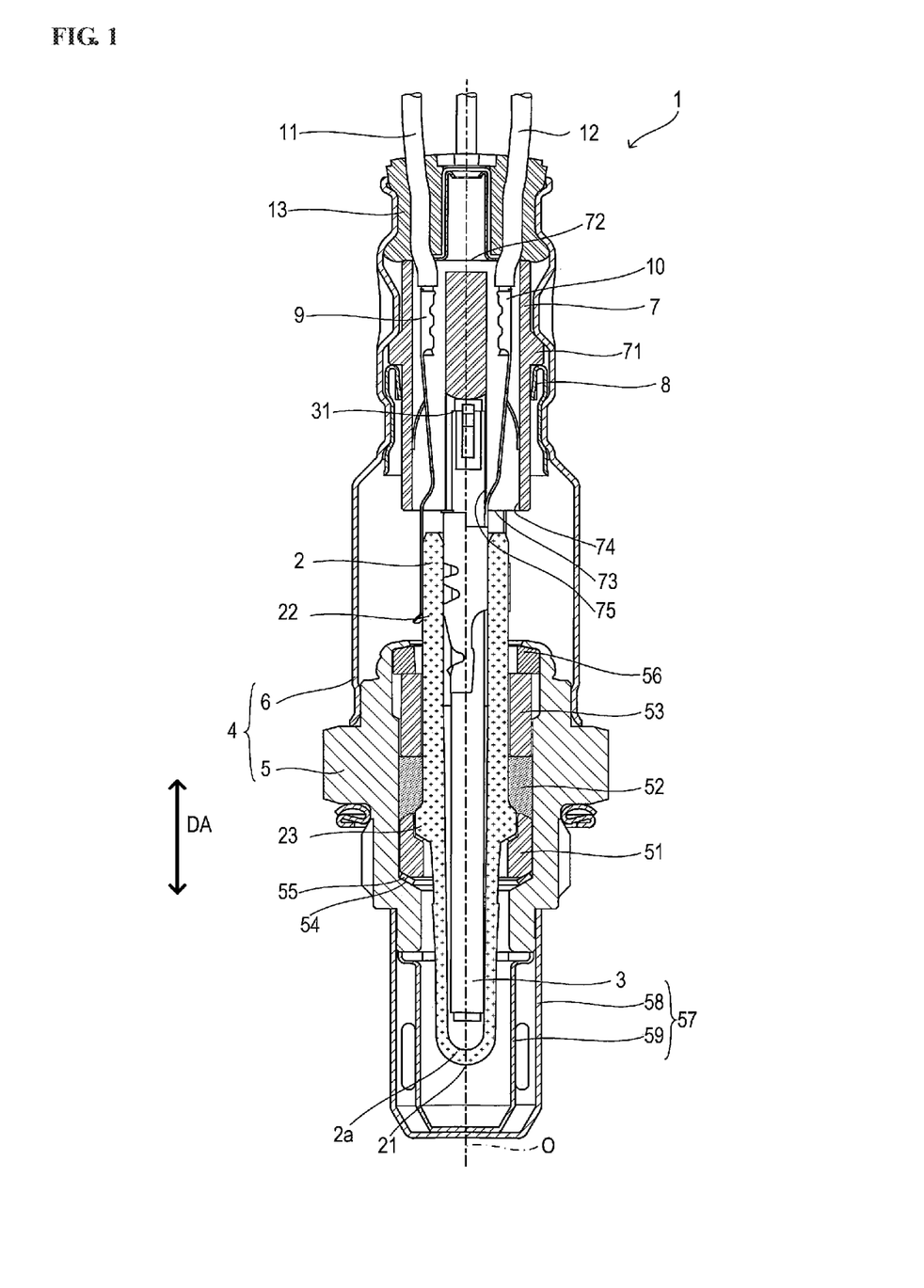
FIG. 1 is a cross-sectional view of a gas sensor, as taken along the direction of an axis thereof, according to one embodiment of the present disclosure.

As shown in FIG. 1, an oxygen sensor 1 according to the first embodiment is provided with a gas sensor element 2, a ceramic heater 3 and a casing 4. Herein, the lower and upper sides of FIG. 1 are referred to front and rear end sides of the oxygen sensor 1, respectively.

The gas sensor element 2 has a bottomed cylindrical shape formed with a closed front end by a solid electrolyte body containing $ZrO_2$ as a predominant component and extending along the direction of an axis O (hereinafter referred to as "axis direction DA") of the gas sensor element. The ceramic heater 3 is rod-shaped and arranged in the gas sensor element 2 so as to heat the gas sensor element 2 by energization thereof. The casing 4 is adapted to accommodate the internal structure of the oxygen sensor 1 and to fix the oxygen sensor 1 to a mounting part such as exhaust pipe of a vehicle.

The casing 4 includes: a metal shell 5 holding the gas sensor element 2 with a front-end-side detection section 2a of the gas sensor element 2 protruding inside the exhaust pipe; and an outer tube 6 extending upward of the metal shell 5 and forming a reference gas space between the gas sensor element 2 and the outer tube 6.

The metal shell 5 has a cylindrical body, and accommodates therein: a supporting member 51 that supports the gas sensor element 2 from the lower side; a filling member 52 formed by filling a talc powder into an upper side of the supporting member 51; and a sleeve member 53 that presses the filling member 52 from the upper side.

More specifically, an inward protrusion 54 is formed on the inner circumference of a front end portion of the metal shell 5 so that the supporting member 51 is supported on the protrusion 54 via a packing 55 to support the gas sensor element 2 from the lower side. The filling member 52 is arranged between an inner circumferential surface of a part of the metal shell 5 on the upper side of the supporting member 51 and an outer circumferential surface of the gas sensor element 2. The cylindrical sleeve member 53 and a cylindrical packing 56 are coaxially inserted in order into a part of the metal shell on the upper side of the filling member 52. In this state, a rear end portion of the metal shell 5 is crimped inwardly (toward the lower side of FIG. 1), whereby the filling member 52 is compressed and filled. Thus, the gas sensor element 2 is securely fixed in position relative to the metal shell 5.

A metallic protector 57 with a plurality of holes is attached by welding to the outer circumference of the front end portion of the metal shell 5 so as to cover the protruding section of the gas sensor element 2. In the first embodiment, the protector 57 has a double structure formed with an outer protector member 58 and an inner protector member 59. The outer protector member 58 is bottomed cylindrical in shape and is located on an outer side of the protector. The inner protector member 59 is bottomed cylindrical in shape and is located on an inner side of the protector.

The outer tube 6 is fixed to the metal shell 5 by welding with the upper portion of the metal shell 5 fitted in a front end opening of the outer tube 6.

An insulating separator 7, which is made of a ceramic material in a cylindrical shape, is inserted in the vicinity of a rear end opening of the outer tube 6.

A radially outwardly protruding flange portion 71 is formed at an axially middle position on an outer circumferential surface of the separator 7. The separator 7 is held in the outer tube 6 by a cylindrical metallic holding member 8 being engaged with the flange portion 71.

Further, the separator 7 has: a plurality of insertion holes 74 formed therethrough from a rear end surface 72 to a front end surface 73 of the separator; and a recess 75 formed in the front end surface 73 so as to accommodate therein a rear end portion 31 of the ceramic heater 3. A metal terminal 9, which extends from an outer circumferential surface of a rear end of the gas sensor element 2 to a front end of a lead wire 11, and a metal terminal 10, which extends from an inner circumferential surface of the rear end of the gas sensor element 2 to a front end of a lead wire 12, are respectively inserted and accommodated in the insertion holes 74 of the separator 7 such that the metal terminal 9 and the metal terminal 10 are kept insulated from each other and kept insulated from the outer tube 6.

The rear end opening of the outer tube 6 is closed by a grommet 13 of fluoro resin. The lead wires 11 and 12 are arranged to pass through the grommet 13.

The gas sensor element 2 has a cylindrical element body 22 formed in a bottomed cylindrical shape with a closed front end portion 21 and extending in the axis direction DA.

A radially outwardly protruding element collar portion 23 is formed circumferentially on the outer circumference of the element body 22.

Figure 2:
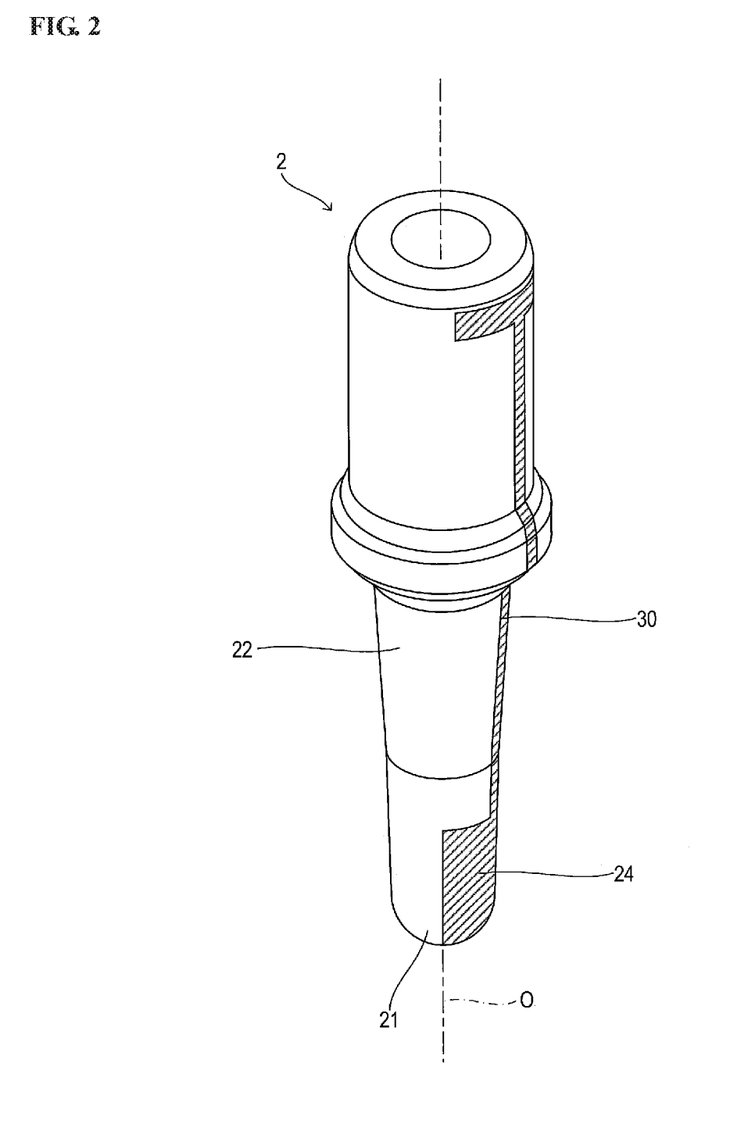
FIG. 2 is an elevation view of a gas sensor element of the gas sensor.

As shown in FIG. 2, an outer electrode 24 is formed on an outer surface of the element body 22 at the front end portion 21 of the gas sensor element 2. In the first embodiment, the outer electrode 24 is made of a composition of platinum (Pt), zirconia ($ZrO_2$) and yttria ($Y_2O_3$). Further, the outer electrode 24 is provided on a part of the gas sensor element 2 in the circumferential direction. In other words, the outer electrode 24 is arc-shaped when viewed in cross section perpendicular to the axis O. An outer lead part 30 is formed on the outer surface of the element body 22 so as to extend from the outer electrode 24 toward the rear end side of the gas sensor element 2.

Figure 3:
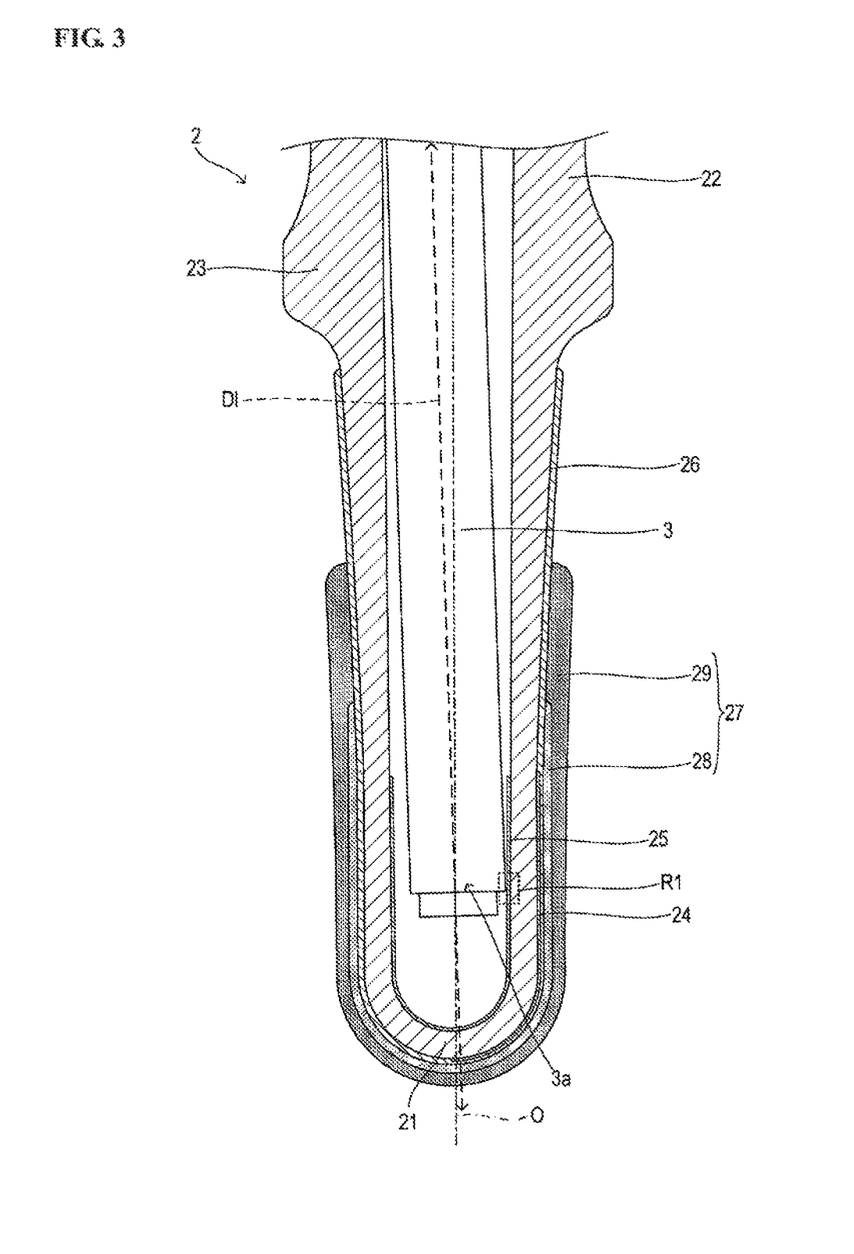
FIG. 3 is a cross-sectional configuration view of the gas sensor element.

As shown in FIG. 3, an inner electrode 25 is formed on an inner surface of the element body 22 at the front end portion 21 of the gas sensor element 2. In the first embodiment, the inner electrode 25 is made of platinum (Pt). Although not specifically shown in the drawings, an inner lead part is formed on the inner surface of the element body 22 so as to extend from the inner electrode 25 toward the rear end side of the gas sensor element 2.

The outer electrode 24 and the inner electrode 25 are disposed on the front end portion 21 of the gas sensor element 2 so as to sandwich the element body 22 therebetween. The element body 22 and the pair of electrodes (i.e., outer and inner electrodes 24 and 25) constitutes an oxygen concentration cell to generate an electromotive force according to the concentration of oxygen in exhaust gas. Accordingly, the gas sensor element 2 detects the oxygen concentration of the exhaust gas by the front end portion 21 thereof with the outer electrode 24 exposed to the exhaust gas and the inner electrode 25 exposed to reference gas.

A gas limiting layer 26 is formed on a part of the outer surface of the element body 22 from the front end portion 22 of the gas sensor element 22 to the vicinity of the element flange portion 23 such that the gas limiting layer 26 covers the outer electrode 24. The gas limiting layer 26 is made in porous form by thermal spraying of a ceramic material such as spinel. The gas limiting layer 26 performs the function of limiting the amount of the exhaust gas flowing to the outer electrode 24.

Furthermore, a porous protection layer 27 is formed on the outer surface of the element body 22 at the front end portion 21 of the gas sensor element 2 such that the porous protection layer 27 overlaps and covers the outer electrode 24 via the gas limiting layer 26. In the first embodiment, the porous protection layer 27 has an inner protection layer 28 and an outer protection layer 29.

The inner protection layer 28 is formed to extend from the front end portion 21 of the gas sensor element 2 to a position closer to the rear end than the outer electrode 24. For example, the inner protection layer 28 can be formed by firing particles of one or more kinds of ceramic materials selected from the group consisting of alumina, spinel, zirconia, mullite, zircon and cordierite.

The outer protection layer 29 is formed to extend from the front end portion 21 of the gas sensor element 2 to a position closer to the rear end than the inner protection layer 28 so as to cover the inner protection layer 28. For example, the outer protection layer 29 can be formed by firing particles of one or more kinds of ceramic materials selected from the group consisting of alumina, spinel, zirconia, mullite, zircon and cordierite.

The ceramic heater 3 is arranged in the gas sensor element 2 such that a longitudinal direction D1 of the ceramic heater 3 is inclined with respect to the axis direction DA. As shown in an enclosed area R1 of FIG. 3, a front end portion 3a of the ceramic heater 3 is in contact with the inner electrode 25 which is disposed on the inner surface of the element body 22, and is opposed to the outer electrode 24 with the element body 22 sandwiched therebetween.

The thickness of the outer electrode 24 is 3 to 10 μm.

Further, the amount of zirconia ($ZrO_2$) contained relative to platinum (Pt) in the outer electrode 24 is 12 to 18 wt %.

Figure 4:
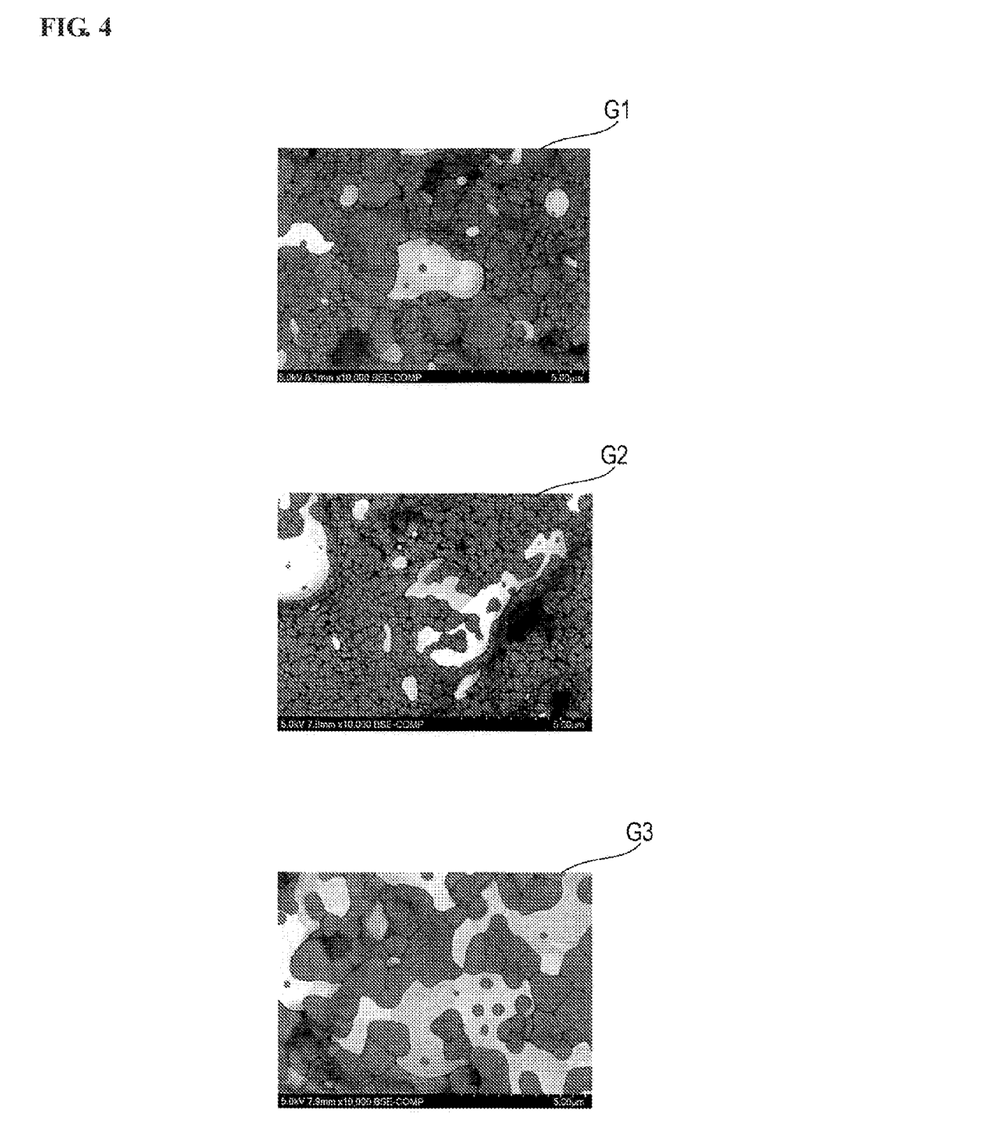
FIG. 4 is a diagram showing backscattered electron composition images of an outer electrode of the gas sensor element.

Image G1 of FIG. 4 is a backscattered electron composition image (hereinafter referred to as "COMPO image") of a cross section of the outer electrode 24 of the first embodiment as measured by a scanning electron microscope (hereinafter referred to as "SEM"). SEM is an abbreviation for Scanning Electron Microscope. Image G2 of FIG. 4 is a COMPO image of an outer electrode formed as a reference example with ceramic particles of small average particle size. Image G3 of FIG. 4 is a COMPO image of an outer electrode formed as a reference example with ceramic particles of large average particle size. The ceramic particles of the outer electrode shown in Image G2 are small in particle size so that, when a gas sensor element is provided with this outer electrode, there occurs separation of the outer electrode during durability test of the gas sensor element. On the other hand, the ceramic particles of the outer electrode shown in Image G3 are large in particle size so that the characteristics of the outer electrode are deteriorated.

Figure 9:
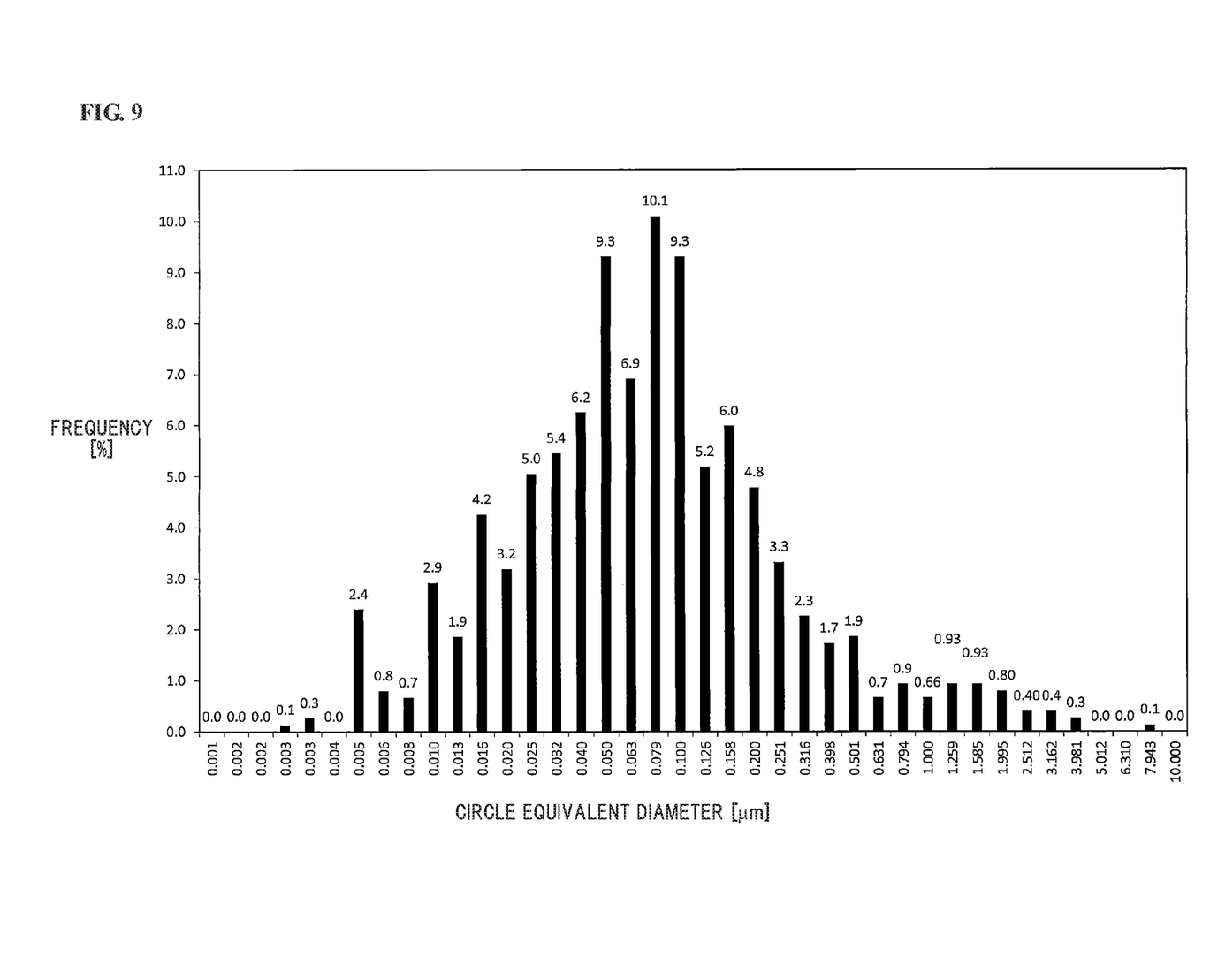
FIG. 9 is a graph of a particle size distribution of $ZrO_2$ particles in the outer electrode.

FIG. 9 is a graph of a surface-area-basis particle size distribution of $ZrO_2$ particles in the outer electrode. More specifically, the particle size distribution graph of the $ZrO_2$ particles is obtained by binarizing Image G1 of FIG. 4 with image processing software "WinROOF", which is available from MITANI Corporation, and counting the circle equivalent diameters of the $ZrO_2$ particles remaining in the binarized image after the removal processing of Pt particles. In the graph, the horizontal axis represents the circle equivalent diameter (in units of μm); and the vertical axis represents the frequency. As shown in the graph of FIG. 9, the cumulative value of peaks appearing in the range of 0.025 μm to 0.200 μm is 68.3% and falls within the range of 60% to 75%; and the cumulative value of peaks appearing in the range of 1.000 μm to 3.162 μm is 3.72% and falls within the range of 2% to 7%.

In other words, the outer electrode 24 of the first embodiment is formed as shown in Image G1 of FIG. 4 such that, in the particle size distribution graph of the $ZrO_2$ particles, the cumulative value of the peaks appearing in the range of 0.025 μm to 0.200 μm is 68.3% and falls within the range of 60% to 75%, and the cumulative value of the peaks appearing in the range of 1.000 μm to 3.162 μm is 3.72% and falls within the range of 2% to 7%. In the outer electrode of Image G2, the $ZrO_2$ particles contained are small in particle size so that, in a particle size distribution graph of those particles, the cumulative value of peaks appearing in the range of 0.025 μm to 0.200 μm exceeds 75%, and the cumulative value of peaks appearing in the range of 1.000 μm to 3.162 μm becomes less than 2%. In the outer electrode of Image G3, the $ZrO_2$ particles contained are large in particle size so that, in a particle size distribution graph of those particles, the cumulative value of peaks appearing in the range of 0.025 μm to 0.200 μm becomes less than 60%, and the cumulative value of peaks appearing in the range of 1.000 μm to 3.162 μm exceeds 7%. By the way, the average particle size of ceramic particles in an electrode can be changed by adjusting the firing temperature during firing of the electrode.

Further, the porosity of the outer electrode 24 is 5% or lower. The porosity can be measured by the following method.

Figure 5:
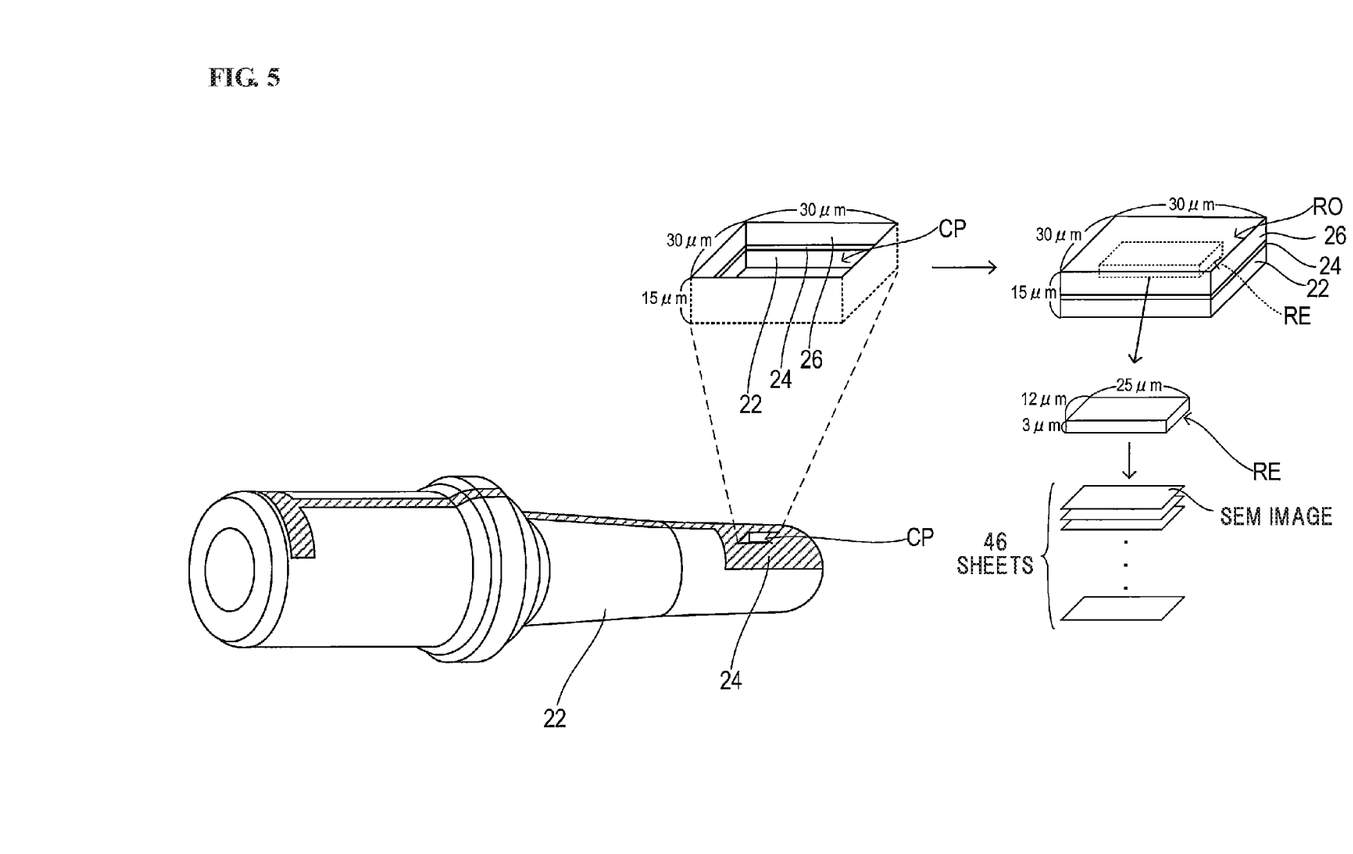
FIG. 5 is a schematic view showing a method of measuring a porosity.

As shown in FIG. 5, used is a FIB/SEM composite device. While a CP recess of 30 μm length×30 μm width×15 μm depth is formed by FIB in the outer surface of the element body 22 on which the outer electrode 24 and the gas limiting layer 26 are provided, a bottom of the CP recess is observed by SEM. FIB is an abbreviation for Focused Ion Beam.

More specifically, a region of 30 μm length×30 μm width in the outer surface of the element body 22 is cut by a depth of 62 nm by FIB. Every time the cutting is done by a depth of 62 nm, the bottom of the recessed region is observed by SEM. Since the cutting is done to a total depth of 15 μm by 62 nm, 15000 [nm]/62 [nm]=242 sheets of SEM images are obtained. It follows that the region RO of 30 μm length×30 μm width×15 μm depth inside the CP recess is observed by SEM. (The observed region is hereinafter referred to as "observation region RO".) The observation region RO includes the gas limiting layer 26, the outer electrode 24 and the solid electrolyte of the element body 22.

The thus-obtained 242 SEM images are processed into a three-dimensional image with analysis software "Amira" (which is available from Maxnet Co., Ltd.).

From the three-dimensional image, a region RE of 12 μm length×25 μm width×3 μm depth including the outer electrode 24 is extracted. (The extracted region is hereinafter referred to as "extraction region RE".) In each of 46 (=3000 [nm]/62 [nm]) sheets of the SEM images in the extraction region RE, pores are selected. Then, the area of the selected pores is determined. The selection of the pores can be done by binarization of the SEM image. The determination of the area of the selected pores can be done with image analysis software such as Photoshop (available from Adobe Systems Inc.). Photoshop is a registered trademark.

The volume of the pores is calculated by adding together the pore areas determined from the 46 SEM images. The porosity is determined as the rate of the volume of the pores to the overall volume of the extraction region.

The occurrence of separation of the outer electrode 24 and the electrical conduction of the outer electrode 24 were tested by varying the amount of zirconia ($ZrO_2$) contained relative to Pt in the outer electrode 24. The test results are shown in TABLE 1.

For separation resistance evaluation, prepared were samples of the gas sensor element in which: the outer electrode 24 had a thickness of 6 μm and a porosity of 5% or lower; and only the content amount of zirconia in the outer electrode 24 was varied from sample to sample. Each of the samples was subjected to durability test for 200 hours in an environment of actual use. After that, a cross section of the sample was observed by SEM to check the occurrence of separation of the outer electrode. When separation of the outer electrode was not observed in the sample, the occurrence of separation was evaluated as OK. The occurrence of separation was evaluated as NG when separation of the outer electrode was observed in the sample. For electrical conduction evaluation, the electrical resistance was measured. The electrical conduction was evaluated as NG when the electrical resistance was 0.9Ω or higher. When the electrical resistance was lower than 0.9Ω, the electrical conduction was evaluated as OK. Further, the thickness was determined as an average value throughout the cross section by observing the cross section by SEM with a magnification of 1000.

TABLE 1

| Content amount of zirconia [wt %] | Occurrence of separation | Electrical conduction |
|---|---|---|
| 7 | NG | OK |
| 12 | OK | OK |
| 15 | OK | OK |
| 18 | OK | OK |
| 25 | OK | NG |

It has been shown by the results of TABLE 1 that, when the amount of zirconia contained in the outer electrode is larger than or equal to 12 wt % and smaller than or equal to 18 wt %, the outer electrode is prevented from separation and shows good electrical conduction.

Next, a manufacturing method of the gas sensor element 2 will be explained below.

In the first step, a pressed compact of solid electrolyte in which yttria ($Y_2O_3$) or calcia (CaO) as a stabilizer is added to zirconia ($ZrO_2$) is provided as the material of the element body 22. The pressed compact is formed by cutting into a cylindrical shape, thereby obtaining a green formed compact.

In the second step, a slurry is applied onto parts of the green formed compact on which the outer electrode 24 and the outer lead part 30 are to be formed.

The slurry for formation of the outer electrode 24 and the outer lead part 30 is prepared by adding, to a platinum powder of 2.0 μm average particle size, 15 wt % of a yttria-doped zirconia powder, 12 wt % of a binder and 300 wt % of butyl carbitol acetate and is applied by an ink jet device. The yttria-doped zirconia powder is of 0.33 μm average particle size in terms of D50. The term "D50" refers to, in a cumulative distribution of particle sizes, a particle size at which the cumulative number of particles reaches 50%.

In the third step, the green formed compact on which the above-mentioned slurry has been applied is subjected to drying and then subjected to firing at 1400° C.

In the fourth step, the gas limiting layer 26 is formed by thermal spraying so as to cover the outer electrode 24.

In the fifth step, a paste containing the material of the inner protection layer 28 is applied onto the gas limiting layer 26 and subjected to firing. The inner electrode 25 and the inner lead part are formed of platinum (Pt) by a known plating process. After that, a paste containing the material of the outer protection layer 29 is applied onto the inner protection layer 28 and subjected to firing.

The gas sensor element 2 is manufactured through the execution of the above respective steps.

As described above, the gas sensor element 2 includes: the element body 22 formed of solid electrolyte containing oxygen-ion conductive $ZrO_2$; the outer electrode 24 disposed on the element body 22 to be exposed to the exhaust gas; and the inner electrode 25 disposed on the element body 22 to be exposed to the reference gas.

In the gas sensor element 2, the outer electrode 24 contains Pt and $ZrO_2$; the thickness of the outer electrode 24 is 3 to 10 μm; the amount of $ZrO_2$ contained relative to Pt in the outer electrode 24 is 12 to 18 wt %; the porosity of the outer electrode 24 is 5% or lower; and, in the graph of the particle size distribution of the $ZrO_2$ particles in the outer electrode 24, the cumulative value of the peaks appearing in the range of 0.025 μm to 0.200 μm is 60 to 75%, and the cumulative value of the peaks appearing in the range of 1.000 μm to 3.162 μm is 2 to 7%.

The above-configured gas sensor element 2 effectively prevents separation of the outer electrode 24.

In the first embodiment, the element body 22 has a bottomed cylindrical shape closed at the front end portion 21 thereof and extending in the axis direction DA. The outer electrode 24 is disposed on the outer surface of the element body 22; whereas the inner electrode 25 is disposed on the inner surface of the element body 22. The outer electrode 24 is formed on the outer surface of the element body 22 so as to cover a part of the front end portion 21.

Since the outer electrode 24 is formed to cover the part of the front end portion 21 of the gas sensor element 2 as mentioned above, the amount of Pt required for the formation of the outer electrode 24 is reduced as compared to the case where the outer electrode 24 is formed to cover the whole of the front end portion 21.

Further, the oxygen sensor 1 includes: the gas sensor element 2; the ceramic heater 3; and the casing 4. The ceramic heater 3 is rod-shaped and arranged in the bottomed cylindrical-shaped element body 22 of the gas sensor element so as to generate heat by energization thereof. The casing 4 is adapted to hold the gas sensor element 2.

In the oxygen sensor 1, the longitudinal direction D1 of the ceramic heater 3 is inclined with respect to the axis direction DA such that the distance between the ceramic heater 3 and the outer electrode 24 decreases from the rear end side toward the front end side of the element body 22. In addition, the front end portion 3a of the ceramic heater 3 is in contact with the inner electrode 25 disposed on the inner surface of the element body 22. The contact of the front end portion 3a of the ceramic heater 3 with the inner electrode 25 is opposed to the outer electrode 24 with the inner electrode 25 and the element body 22 sandwiched therebetween.

Since the outer electrode 24 formed on the part of the front end portion 21 of the element body 22 and the front end portion 3a of the ceramic heater 3 are opposed to each other with the inner electrode 25 and the element body 22 sandwiched therebetween as mentioned above, the oxygen sensor 1 allows efficient supply of heat from the ceramic heater 3 to the outer electrode 24.

In the above-described first embodiment, the element body 22 corresponds to a solid electrolyte body; the outer electrode 24 corresponds to a detection electrode; and the inner electrode 25 corresponds to a reference electrode.

Furthermore, the oxygen sensor 1 corresponds to a gas sensor; the ceramic heater 3 corresponds to a heater; and the casing 4 corresponds to a holding member.

Second Embodiment

Hereinafter, a second embodiment of the present disclosure will be described below with reference to the drawings.

Figure 6:
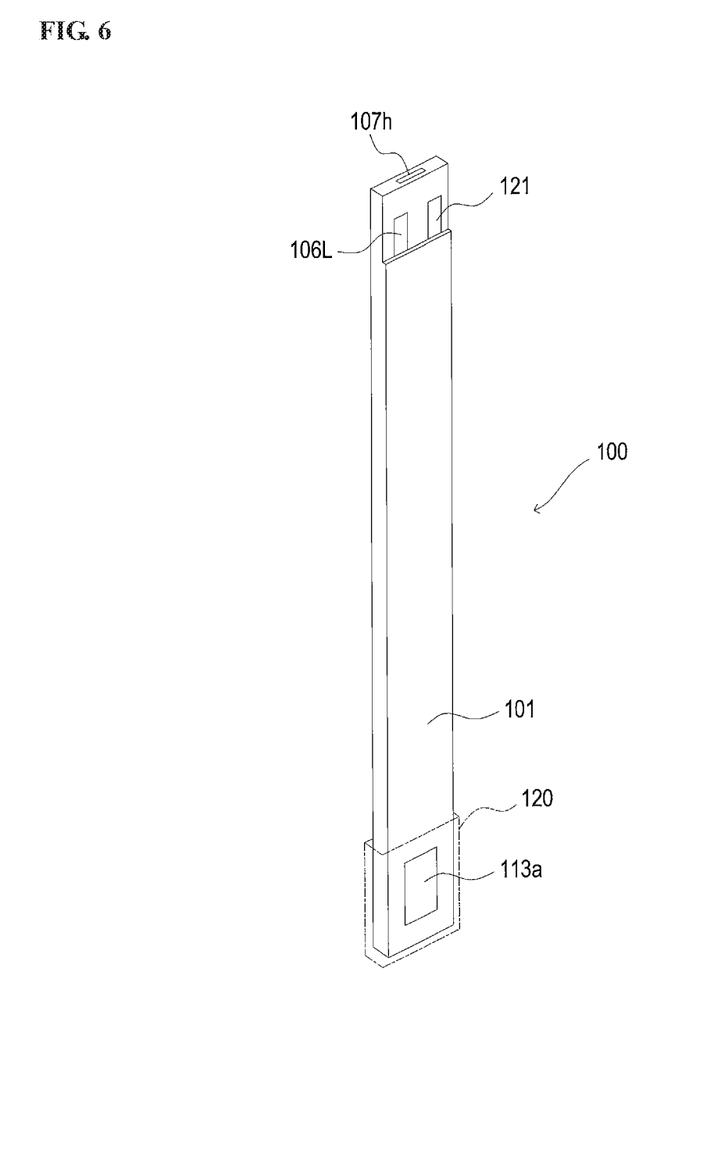
FIG. 6 is a perspective view of a plate-shaped gas sensor element according to another embodiment of the present disclosure.

As shown in FIG. 6, a plate-shaped gas sensor element 100 according to the second embodiment is provided with an element body 101 and a porous protection layer 120.

Figure 7:
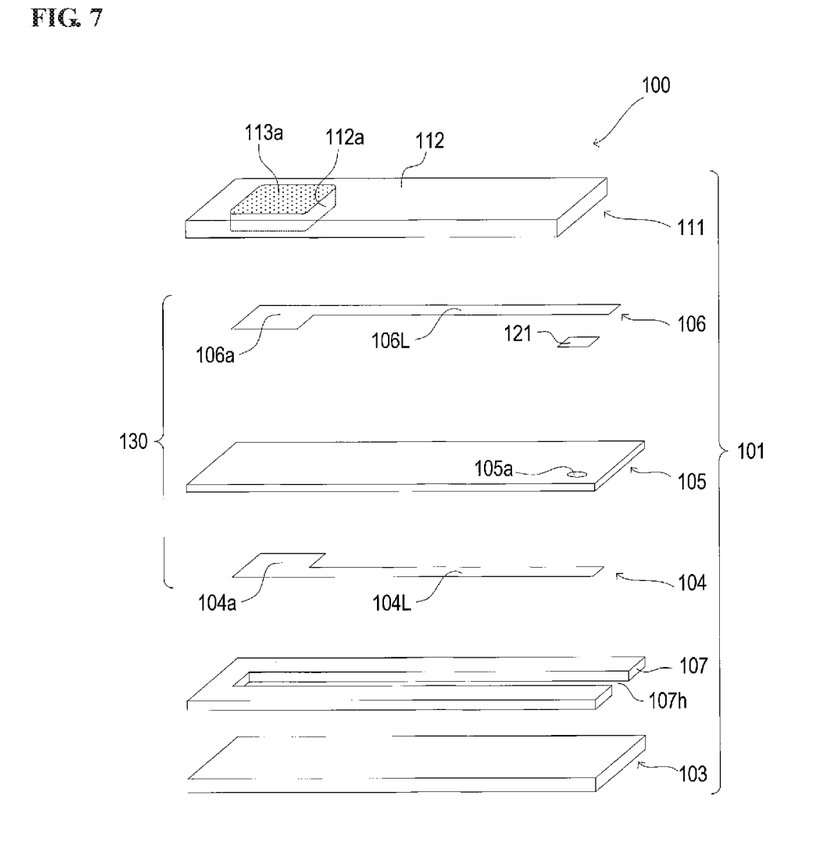
FIG. 7 is an exploded perspective view of the plate-shaped gas sensor element.

The element body 101 has an oxygen concentration detection cell 130, a reinforcing protection layer 111, an air introduction hole layer 107 and an underlying layer 103 as shown in FIG. 7. In FIG. 7, the porous protection layer 120 is omitted from illustration.

The oxygen concentration detection cell 130 includes a reference electrode 104, a solid electrolyte body 105 and a measurement electrode 106. The reference electrode 104 and the measurement electrode 106 are disposed so as to sandwich the solid electrolyte body 105 therebetween.

The reference electrode 104 has a reference electrode part 104a and a reference lead part 104L. The reference lead part 104L is formed to extend from the reference electrode part 104a along a longitudinal direction of the solid electrolyte body 105.

The measurement electrode 106 has a measurement electrode part 106a and a detection lead part 106L. The detection lead part 106L is formed to extend from the measurement electrode part 106a along the longitudinal direction of the solid electrolyte body 105.

The reinforcing protection layer 111 includes a reinforcing portion 112 and an electrode protecting portion 113a.

The reinforcing portion 112 is plate-shaped and arranged so as to protect the solid electrolyte body 105 with the detection lead part 106L sandwiched between the solid electrolyte body 105 and the reinforcing portion 112. The reinforcing part 112 is made of the same material as the solid electrolyte body 105. A protecting-portion arrangement space 112a is formed through the reinforcing portion 112 in a thickness direction thereof.

The electrode protecting portion 113a is made of a porous material and arranged in the protecting-portion arrangement space 112a so as to protect the detection electrode part 106a by sandwiching the detection electrode part 106a between the solid electrolyte body 105 and the electrode protecting portion 113a.

In the second embodiment, the plate-shaped gas sensor element 100 is adapted for use in a so-called oxygen concentration electromotive force type gas sensor to detect the concentration of oxygen according to a voltage (i.e. electromotive force) developed between the electrodes of the oxygen concentration detection cell 130.

The underlying layer 103 and the air introduction hole layer 107 are stacked on the reference electrode 104 so as to sandwich the reference electrode 104 between the solid electrolyte body 105 and these layers. The air introduction hole layer 17 has a substantially U shape open at a rear end thereof. An inner space surrounded by the solid electrolyte body 105, the air introduction hole layer 107 and the underlying layer 103 serves as an air introduction hole 107h. The reference electrode 104 is arranged to be exposed to air which is introduced into the air introduction hole 107h.

As mentioned above, the electrolyte body 101 has a laminated structure in which the underlying layer 103, the air introduction hole layer 107, the reference electrode 104, the solid electrolyte body 105, the measurement electrode 106 and the reinforcing protection layer 111 are laminated together. The electrode body 101 as a whole is formed in a plate shape.

A terminal end of the reference lead part 104L is electrically connected to a sensor element-side pad 121 on the solid electrolyte body 105 via a conductor which is formed in a through hole 105 of the solid electrolyte body 105. A dimension of the reinforcing protection layer 111 in the axis direction (i.e. left-right direction of FIG. 7) is made shorter relative to a terminal end of the detection lead part 106L. The sensor element-side pad 121 and the terminal end of the detection lead portion 106L are exposed outside from a rear end of the reinforcing protection layer 111 and are electrically connected to external terminals (not shown) for connection to an external circuit.

The porous protection layer 120 is disposed on the entire circumference of a front end portion of the element body 101 as shown in FIG. 6.

Figure 8:
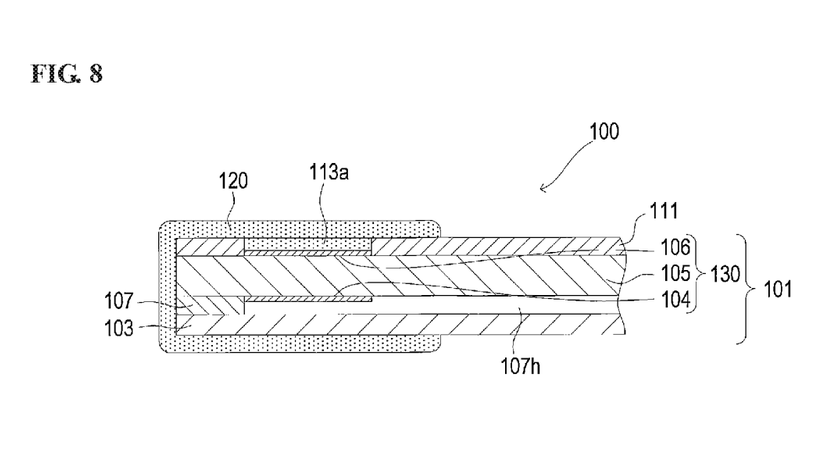
FIG. 8 is an enlarged cross-sectional view of a front end part of the plate-shaped gas sensor element.

As shown in FIG. 8, the porous protection layer 120 is formed to overlay a front end surface of the element body 101 and extend toward the rear in the axis direction (i.e. left-right direction of FIG. 8).

Further, the porous protection layer 120 is provided to cover a part of the element body 101 including at least the reference electrode part 104*a* and the measurement electrode part 106*a*.

The plate-shaped gas sensor element 100 may be exposed to a poisoning substance such as silicon, phosphorus etc. in exhaust gas. Water drops in exhaust gas may be adhered to the plate-shaped gas sensor element 100. It is however possible, by arranging the porous protection layer 120 on the outer surface of the plate-shaped gas sensor element 100, to trap the poisoning substance and prevent the water drops from direct contact with the plate-shaped gas sensor element 100.

The solid electrolyte body 105 is in the form of a sintered compact of partially stabilized zirconia in which yttria ($Y_2O_3$) or calcia (CaO) as a stabilizer is added to zirconia ($ZrO_2$). In the second embodiment, the solid electrolyte body 105 contains zirconia as a predominant component, wherein 50 to 83.3 mass % of the zirconia is tetragonal zirconia.

The reference electrode 104 is formed predominantly of platinum (Pt). On the other hand, the measurement electrode 106 is formed of a composition of platinum (Pt), zirconia ($ZrO_2$) and yttria ($Y_2O_3$). The thickness of the measurement electrode 106 is 3 to 10 μm. The amount of zirconia ($ZrO_2$) contained relative to platinum (Pt) in the measurement electrode 106 is 12 to 18 wt %. The porosity of the measurement electrode 106 is 5% or lower.

As described above, the plate-shaped gas sensor element 100 includes: the solid electrolyte body 105 containing oxygen-ion conductive $ZrO_2$; the measurement electrode 106 disposed on the solid electrolyte body 105 to be exposed to the exhaust gas; and the reference electrode 104 disposed on the solid electrolyte body 105 to be exposed to the air.

In the plate-shaped gas sensor element 100, the measurement electrode 106 contains Pt and $ZrO_2$; the thickness of the measurement electrode 106 is 3 to 10 μm; the amount of $ZrO_2$ contained relative to Pt in the measurement electrode 106 is 12 to 18 wt %; the porosity of the measurement electrode 106 is 5% or lower; and, in a graph of a particle size distribution of $ZrO_2$ particles in the measurement electrode 106, the cumulative value of peaks appearing in a range of 0.025 μm to 0.200 μm is 60 to 75%, and the cumulative value of peaks appearing in a range of 1.000 μm to 3.162 μm is 2 to 7%.

The above-configured plate-shaped gas sensor element 100 provides the same effects as those of the gas sensor element 2 according to the first embodiment.

In the above-described second embodiment, the plate-shaped gas sensor element 100 corresponds to a gas sensor element; the solid electrolyte body 105 corresponds to a solid electrolyte body; and the measurement electrode 106 corresponds to a detection electrode.

Although the specific embodiments of the present disclosure have been described above, the present disclosure is not limited to these specific embodiments. Various changes and modifications can be made to the above-described embodiments.

For example, the first embodiment may be implemented as a gas sensor with a plate-shaped gas sensor element as in the second embodiment although the gas sensor is provided with the cylindrical gas sensor element in the first embodiment as mentioned above. Since the gas sensor with the plate-shaped gas sensor element is known, a detailed explanation of the configuration of such a gas sensor will be omitted herefrom.

The function of a single component in the above-described embodiments may be shared by a plurality of components, or functions of a plurality of components may be integrated into one component. A part of the configuration of each of the above-described embodiments may be omitted. At least a part of the configuration of any one of the above-described embodiments may be added to or replace the configuration of another embodiment. Any embodiments included in the technical ideas specified by the wording of the following claims are defined as embodiments of the present disclosure.

The invention claimed is:

1. A gas sensor element comprising:
a solid electrolyte body containing oxygen-ion conductive $ZrO_2$;
a detection electrode disposed on the solid electrolyte body to be exposed to a gas under measurement; and
a reference electrode disposed on the solid electrolyte body to be exposed to a reference gas,
wherein the detection electrode contains Pt and $ZrO_2$,
wherein the detection electrode has a thickness of 3 to 10 μm,
wherein the amount of $ZrO_2$ contained relative to Pt in the detection electrode is 12 to 18 wt %;
wherein the detection electrode has a porosity of 5% or lower, and
wherein, in a graph of a particle size distribution of $ZrO_2$ particles in the detection electrode, a cumulative value of peaks appearing in a range of 0.025 μm to 0.200 μm is 60 to 75%, and a cumulative value of peaks appearing in a range of 1.000 μm to 3.162 μm is 2 to 7%.

2. The gas sensor element according to claim 1,
wherein the solid electrolyte body has a bottomed cylindrical shape formed with a closed front end portion and extending in the direction of an axis of the gas sensor element,
wherein the detection electrode is disposed on an outer surface of the solid electrolyte body;
wherein the reference electrode is disposed on an inner surface of the solid electrolyte body, and
wherein the detection electrode is formed on the outer surface of the solid electrolyte body so as to cover a part of the front end portion.

3. A gas sensor comprising:
the gas sensor element according to claim 2;
a rod-shaped heater arranged in the bottomed cylindrical-shaped solid electrolyte body of the gas sensor element and configured to generate heat by energization thereof; and
a holding member holding the gas sensor element,
wherein a longitudinal direction of the heater is inclined with respect to the direction of the axis such that a distance between the heater and the detection electrode decreases from a rear end side toward a front end side of the solid electrolyte body, wherein a front end portion of the heater is in contact with the reference electrode disposed on the inner surface of the solid electrolyte body, and wherein the contact of the front end portion of the heater with the reference electrode is opposed to the detection electrode with the reference electrode and the solid electrolyte body sandwiched therebetween.

4. A gas sensor comprising:
the gas sensor element according to claim 1; and
a holding member holding the gas sensor element.

* * * * *